(12) United States Patent
Morales (10) Patent No.: US 11,474,761 B1
(45) Date of Patent: Oct. 18, 2022

(54) PRINTING SYSTEM AND METHODS TO ENABLE IMPOSITION USING A DIGITAL FRONT END

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/388,827

(22) Filed: Jul. 29, 2021

(51) Int. Cl.
*G06F 3/12* (2006.01)

(52) U.S. Cl.
CPC .......... *G06F 3/1243* (2013.01); *G06F 3/1204* (2013.01); *G06F 3/1206* (2013.01)

(58) Field of Classification Search
None
See application file for complete search history.

(56) References Cited

U.S. PATENT DOCUMENTS

| | | | |
|---|---|---|---|
| 8,743,382 B2* | 6/2014 | Manchala | G06F 3/1225 358/1.15 |
| 9,880,793 B2* | 1/2018 | Yajima | G06F 3/126 |
| 10,185,518 B1 | 1/2019 | Hossepian | |
| 10,185,525 B1 | 1/2019 | Hossepian | |
| 10,356,277 B1 | 7/2019 | Hossepian | |
| 2006/0126119 A1* | 6/2006 | Morales | G06F 3/1208 358/1.18 |
| 2017/0091600 A1* | 3/2017 | Hotokeishi | G06F 3/1281 |

* cited by examiner

*Primary Examiner* — Paul F Payer
(74) *Attorney, Agent, or Firm* — Millen, White, Zelano & Branigan, P.C.; William F. Nixon (57) ABSTRACT

A printing system includes a printing device having an embedded digital front end (DFE) and at least one client device that sends print jobs to the printing device. The embedded DFE provides imposition functionality to define imposition settings for a job file. The DFE downloads the job file, a user interface, and an imposition engine to the client device. The client device uses the user interface to enter imposition settings and instructions that are applied to the job file. A visual representation can be made within the user interface to show the imposition setting. After imposition operations are complete, the client device uploads the imposed job file and an imposition template of the imposition settings to the DFE. The embedded DFE stores the imposed job file and the imposition template.

20 Claims, 7 Drawing Sheets

PRINTING SYSTEM AND METHODS TO ENABLE IMPOSITION USING A DIGITAL FRONT END

FIELD OF THE INVENTION

The present invention relates to enabling the use of imposition for printing operations by an embedded digital front end.

DESCRIPTION OF THE RELATED ART

Server digital front ends (DFEs) for production printing may implement high performance processors with many cores and a large amount of memory. The computing resources are used to provide fast raster image processing and ancillary document management services that are common in modern production printing devices. A feature that may be found in server DFEs that is not generally available in embedded DFEs is robust job imposition. Although embedded DFEs have the capacity to queue jobs and to perform job operations typical of server DFEs, these components of printing devices may not have the performance required to provide rich functionality found in server DFEs. For example, modern DFE user interfaces allow users to define complex imposition settings, including ganged imposition that combines multiple jobs into the same press sheet. Embedded DFEs, which use low cost processors that have limited memory, do not have the processing power and memory to perform complex imposition. For this reason, imposition using embedded DFEs tend to be simple and limited.

SUMMARY OF THE INVENTION

A printing system is disclosed. The printing system includes an embedded digital front end (DFE) to control printing operation within a printing device. The embedded DFE receives imposition settings defined for a print job. The printing system also includes a first client configured to submit the print job to the embedded DFE with an imposition template that defines the imposition settings. The first client downloads an imposition engine to define the imposition template, a user interface to interact with the imposition engine, and a job file for the print job from the embedded DFE. The imposition engine, at the first client, is configured to reorder the job file to generate an imposed job file using the user interface at the first client to define the imposition settings. The first client uploads the imposed job file and the imposition template with the imposition settings to the embedded DFE.

A method for defining a print job within a printing system is disclosed. The method includes downloading, at a client, an imposition engine, a user interface to interact with the imposition engine, and a job file for the print job from an embedded digital front end (DFE) of a printing device connected to the client. The method also includes entering, via the user interface at the client, imposition settings for the job file. The method also includes applying the imposition settings to the job file using the imposition engine at the client to create an imposed job file. The method also includes generating an imposition template for the job file based on the applied imposition settings at the client. The method also includes uploading the imposed job file and the imposition template from the client to the embedded DFE.

A method for printing a document is disclosed. The method includes creating a print job for the document at a first client connected to a printing device. The method also includes downloading, at the first client, an imposition engine, a user interface to interact with the imposition engine, and a job file for the print job from an embedded digital front end (DFE) of the printing device. The method also includes using the imposition engine to define imposition settings for the job file using the user interface at the first client. The method also includes applying the imposition settings to a visual representation of the job file within the user interface. The method also includes confirming the imposition settings for the job file to create an imposed job file. The method also includes generating an imposition template based on the imposition settings at the first client. The method also includes receiving the imposed job file and the imposition template at the embedded DFE of the printing device. The method also includes printing the imposed job file for the document with the imposition template at the printing device.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments allow an embedded digital front end (DFE) to provide imposition capabilities that are equivalent to that of a server DFE without requiring the more powerful hardware and cost associated with the server DFE. The embedded DFE achieves this feature by relying on clients to perform imposition operations. In addition, this feature does not require that the client install and manage imposition software. The imposition engine is delivered to the clients as part of the user interface for the embedded DFE when the user connects to the web user interface of the embedded DFE. This feature may eliminate the need for customers that require production imposition, but that do not require high performance job processing, to acquire the functionality to implement the imposition without incurring the expense of a server DFE. This feature also may provide a price advantage to the vendor as it allows them to offer a lower cost offering that meets the requirements for the customer.

The disclosed embodiments provide a way to enable sophisticated imposition in a low cost embedded DFE by using the computer resources in clients to perform this task for the embedded DFE. Unlike conventional printing systems that are independent imposition applications, the disclose embodiments enables this functionality without requiring use of any specialized software in the client. In order to enable sophisticated imposition, when a client connects to the web user interface of the embedded DFE, the client will download a job file, a user interface that can be used to define complex imposition and an imposition engine.

As the user defines imposition settings, the settings are applied to the job locally within the web browser for the user at the client. Once the user defines all the imposition settings and closes the job, the printing system will upload both the imposed job file and the imposition template that was applied to the file. The embedded DFE retains both the original and the imposed job file.

In some embodiments, another client may connect to the embedded DFE to adjust imposition settings. In this instance, the client will download the same set of files as above. In addition, the client will download the imposition template and, optionally, the imposed job file. The imposition user interface will be prepopulated with the settings from the imposition template. The user may adjust imposition settings and save or submit the print job. For any of the above-disclosed processes, the user may print the job after imposition and other settings are defined. The disclosed embodiments also may use the processes to add, replace, and delete document pages, add and edit watermarks, and add and edit tab annotations.

Figure 1A:
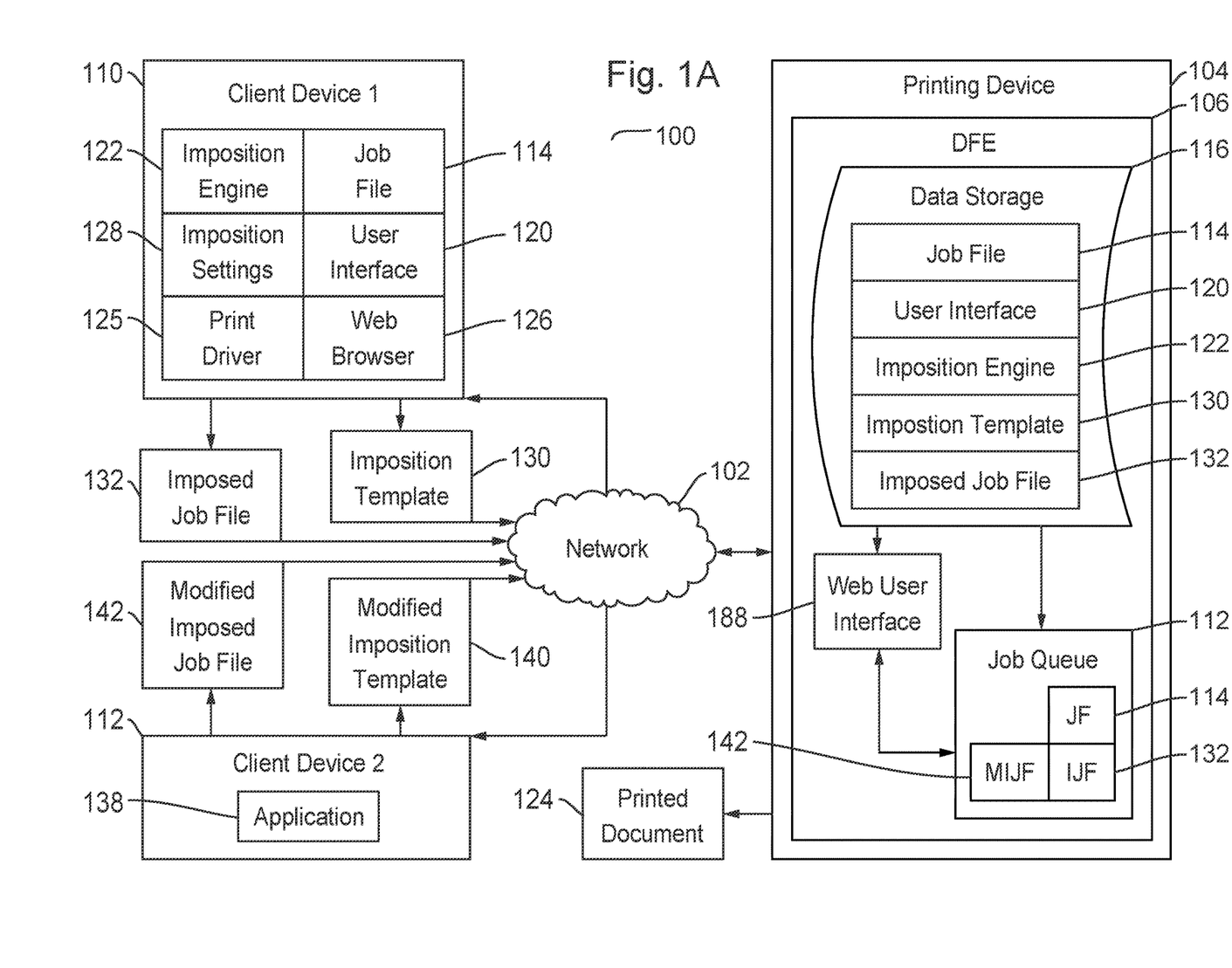
FIG. 1A illustrates a block diagram of a printing system having a printing device connected to client devices according to the disclosed embodiments.

FIG. 1A depicts a printing system 100 having a printing device 104 connected to a client devices 110 and 112 according to the disclosed embodiments. Printing system 100 includes printing device 104 that receives print jobs from client devices 110 and 112. Client devices 110 and 112 may be any devices capable of executing applications and programs to generate documents and files, such as, for example, a computer, a laptop computer, mobile device or tablet, smart phone, kiosk, and the like. Client devices 110 and 112 may send print jobs to printing device 104 over one or more networks 102 implemented within printing system 100. Additional client devices may be connected to printing device 104. Further, client devices 110 and 112 are not the same devices. For example, client device 110 may be a laptop computer while client device 112 is a mobile device, such as a smartphone or tablet.

Network 102 may be used by system 100 to exchange data between devices within system 100. Devices 104, 110, and 112 are configured to communicate with network 102 over a physical communications interface or layer such as air interfaces and/or a direct wired connection. Air interfaces may be an given cellular communications protocol (e.g., GSM, CDMA, W-CDMA, EVDO, eHRPD, EDGE, 4G LTE, 5G LTE, 5G NR/New Radio, etc.) and, or a wireless IP protocol (e.g., IEEE 802.11 family). Alternatively, network 102 may be a local area network, wide area network, an ad-hoc network. Network 102 allows printing device 104 and client devices 110 and 112 to exchange data using the appropriate protocol.

Printing device 104 is disclosed in greater detail below. It includes embedded digital front end (DFE) 106, or a printing device controller, that is the workflow touchpoint which accepts a print job, or print file, commonly a PDF or PostScript file. DFE 106 converts the file of the print job into a format that print engine 260, disclosed below, can use to lay down the content of the document corresponding to the print job on a media. DFE 106 may include a raster image processor (RIP) as well as other components.

Figure 1B:
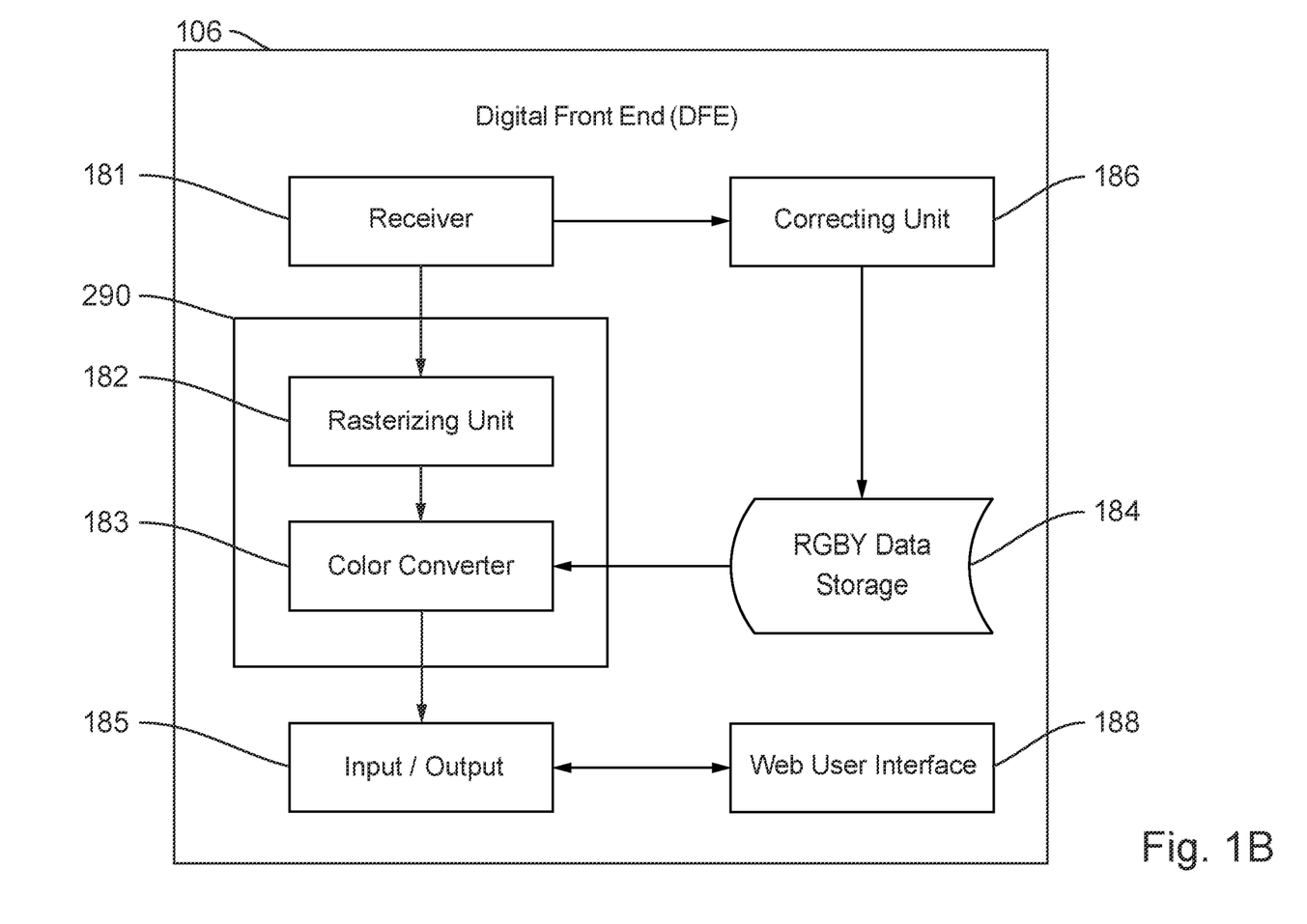
FIG. 1B illustrates a block diagram of an embedded digital front end for the printing device according to the disclosed embodiments.

FIG. 1B depicts a block diagram of DFE 106 according to the disclosed embodiments. DFE 106 includes a receiver 181, an RIP firmware 290 including rasterizing unit 182 and a color converter 183, an RGBY data storage 184, an input/output connector 185, and a correcting unit 186. RIP firmware 290 also is disclosed in FIG. 2. Additional components within DFE 106 may be implemented, including those disclosed in FIG. 1A. DFE 106, therefore, also includes job queue 112 and data storage 116.

The disclosed embodiments will refer to client device 110 for illustrative purposes. Features disclosed for client device 110 also may be available for client device 112. Receiver 181 receives a print job generated by client device 110 and outputs the print job to rasterizing unit 182 of RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

Rasterizing unit 182 converts image data associated with the print job into raster data to thereby generate rendering data, and outputs the generated rendering data to color converter 183. Color converter 183 converts the rendering data from rasterizing unit 182 into rendering data in a CMYK format. When the rendering data is originally in the CMYK format, or CMYK rendering data, the conversion may not be performed. Color converter 183 performs gradation conversion of the CMYK rendering data, with reference to one or more tone reproduction curves (TRCs) stored in RGBY data storage 184. A TRC refers to data indicating the relationship between a colored gradation value for rendering data and print color, or print density, on a given print medium.

When print color provided by printing device 104 alters over time, the TRCs stored in RGBY data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in RGBY data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in RGBY data storage 184 is replaced with the generated TRC. Correcting unit 186 may correct the TRC. Correcting unit 186 may rewrite a part of the TRC stored in RGBY data storage 184 to thereby correct the TRC.

RIP firmware 290 includes rasterizing unit 182 and color converter 183. The rendering data generated by RIP firmware 290 is transmitted within printing device 104 via input/output connector 185. The print condition information and the print medium type, as well as the rendering data, may be transmitted to engine 260 found in printing device 104 disclosed in FIG. 2.

DFE 106 also includes web user interface 188 that may communicate with client devices 110 and 112 using, for example input/output connector 185. Web user interface 188, or web application, allows a user of client device 110 or 112 to interact with content or software running on DFE 106 through a web browser 126 at the client device. The content, or web page, is downloaded from DFE 106 and the user can interact with this content in web browser 126, which acts as a client. The distributed nature allows the content to be stored on DFE 106, while the ubiquitous nature of web browser 126 permits a convenient access to the content at the DFE. The disclosed embodiments, therefore, may use web browser 126 to interact with web user interface 188 to access user interface 120 and imposition engine 122, as disclosed below.

Referring back to FIG. 1A, DFE 106 also includes job queue 112. Job queue 112 includes print jobs received for processing as disclosed above. Print jobs include job file 114 that may be received from client device 110. Job queue 112 may place the print jobs in an order for printing on printing device 104. DFE 106 also includes data storage 116 that stores various files, such as imposition user interface 120 and imposition engine 122. User interface 120 and imposition engine 122 are disclosed in greater detail below.

When client device 110 defines a new print job having job file 114 to submit to DFE 106, it may define the print description language (PDL) files that are part of the print job and job processing instructions, such as hold, print, quantity, media, and the like that will be used to produce the print job. These instructions may be part of the print condition and the print medium type information disclosed above. These instructions also may include imposition settings. In most instances, the imposition functionality available via print driver 125 at client device 110 is limited.

To reduce costs and improve productivity, production printing systems, such as system 100, do not print a single page or artwork at a time. A print job may print 4, 16, or even 96 pages. Imposition refers to the prepress process of positioning pages or artwork on press sheets in such a manner that the print job may be printed and finished properly. As such, imposition may be handled differently for commercial, newspaper, and packaging jobs. What may be common for these jobs is that the imposition is not limited to positioning pages or artwork on a sheet. Part of the process is making sure that all the marks that are needed by the printing devices are added. These features include cutting marks, color bars, collation marks, graphic elements, and the like. Commercial print jobs may include producing catalogs, magazines, brochures, leaflets, flyers, stationary, business cards, posters, billboards, and the like.

Figure 1C:
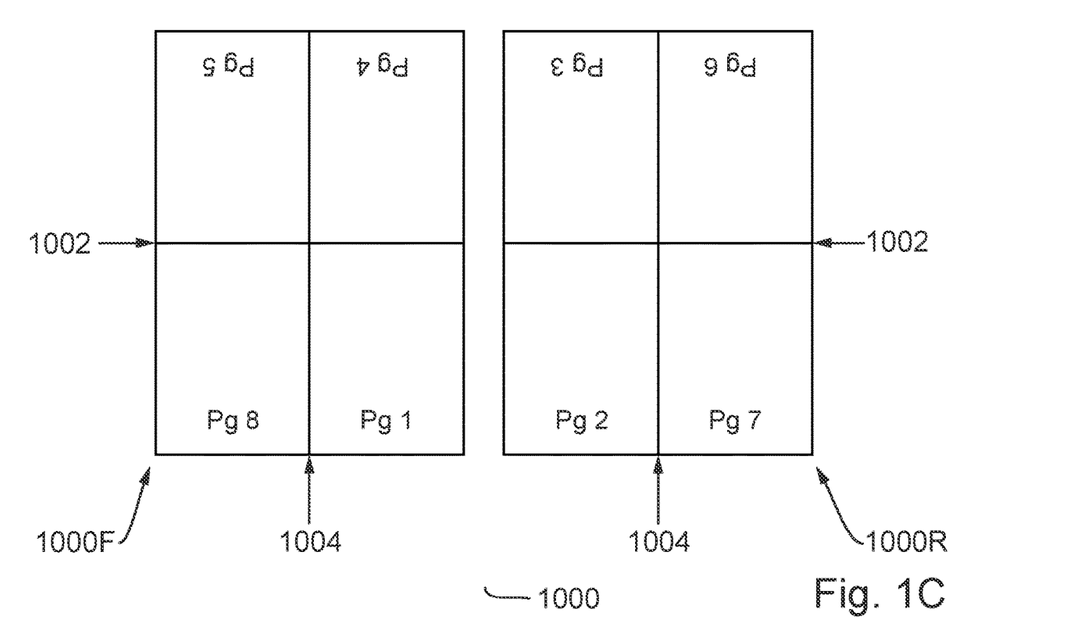
FIG. 1C illustrates an example of imposition on a sheet for offset printing according to the disclosed embodiments.

FIG. 1C depicts an example of imposition on a sheet 1000 for offset printing according to the disclosed embodiments. In offset printing, the pages of books may be printed on large sheets of paper, with multiple pages printed on each side of these sheets. Known as signatures, these large sheets will be folded down and trimmed after they are printed. The use of signatures allows multiple pages to print per press impression, which reduces the number of printing plates needed and minimizes paper waste. It also streamlines the printing process and binding operation.

Sheet 1000 include sheet front 1000F and sheet back 1000R. As disclosed above, imposition refers to the process of arranging the pages so that once the printed signature sheets are folded and trimmed, the pages will appear in the correct order. The disclosed embodiments perform imposition at client device 110 prior to DFE 106 releasing job file 114 of the print job to be printed. Sheet 1000 shows an example of how the pages of an 8 page booklet may be imposed. As shown, the pages appear out of order, with some upside-down. This configuration, however, will produce pages with the proper orientation, and in the correct sequence, once the signature is printed, folder, and trimmed.

Referring to FIG. 1C, four pages (page 1, page 4, page 5, and page 8) will print on sheet front 1000F. Four pages (page 2, page 3, page 6, and page 7) will print on sheet back 1000R. Pages 4 and 5 of sheet front 1000F and pages 3 and 6 of sheet back 1000R may be oriented "upside down" or not aligned with the other pages of sheet 1000. After printing by printing device 104, the two-sided signature will be folded in half horizontally along line 1002 so that page 3 contacts page 2 and page 6 contacts page 7. Then sheet 1000 is folded vertically along line 1004 so that page 4 meets page 5. The booklet of sheet 1000 may be bound along the fold that forms its spine. All remaining folds may be trimmed off to allow the pages to open freely.

Signatures, such as sheet 1000, may include multiple pages. The imposition settings determine how those pages will be positioned on the signature, how many pages are combined, how the pages are positioned, and which additional information is added to the signature is determined by various parameters. For example, these parameters to be set forth by imposition settings 128 may include page and sheet size, the number of pages of the printed product, job content (the content of pages, such as large flat tints or dark images, may require a change in imposition template 130 to make job file 114 easier to print), the printing device or output bin, the work style, which deals with how the sheets will be printed, the position of the pages on the sheet, press marks (registration marks, a colorbar, or other elements to be added to the sheet), and the like.

Imposition also may include the binding style. Some publications include so many pages that they are printed using multiple signatures. When there is no binding involved, such as with posters, inserts, business cards, leaflets, and the like, this may be referred to as flat work. When a job requires multiple signatures, then how these signatures are bound may affect the imposition scheme. Examples of binding styles may include saddle stitched binding, where all the sheets are printed and folded, after which they are inserted inside each other and one or more staples are applied to the spine. This style also means that the first sheet contains both the first and the last page of the publication.

Another binding style may be perfect bound. All the sheets are printed and folded, after which the folded sheets are stacked on top of each other. Glue is applied to the spine and a cover sheet is wrapped around the book to encase the spine. The first signature contains all the pages from the first part of the publication. The last pages are on another sheet.

In some instances, the imposition may address physical properties of folding sheets, such as creep, bottling, and web growth. The bigger the signatures or press, the more these effects may impact the print job.

Some print jobs involve ganging, which may be defined as the ability to group different jobs together inside the same print run. This term, as well as "gang," may be used to describe a few different imposition and layout behaviors that are similar, but yet different. Ganging or gang-run printing may relate to a printing method in which multiple printing projects are placed on a common paper sheet in an effort to reduce printing costs and paper waste. This feature offers the advantages to be economical and reduce waste.

Figure 1D:
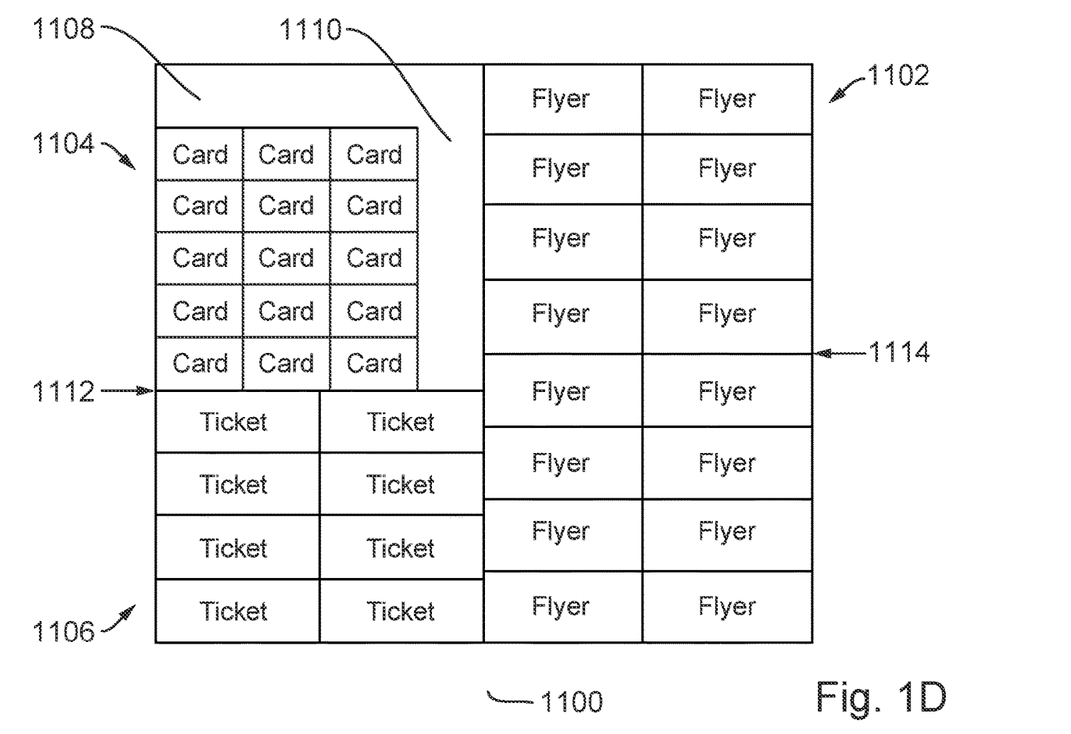
FIG. 1D illustrates an example of a sheet having a gang-run print job according to the disclosed embodiments.

FIG. 1D depicts an example of a sheet 1100 having a gang-run print job according to the disclosed embodiments. Sheet 1100 may include three separate jobs 1102, 1104, and 1106. Job file 114 may encompass the different print jobs for these documents. Job 1102 may correspond to a flyer for an event, job 1104 may correspond to business cards, and job 1106 may correspond to tickets for the event. Each job is different in size and numbers being printed. Further, not all the space on sheet 1100 is used. Space 1108 of sheet 1100 may be shown between cards 1104 and the top edge of the sheet, whereas space 1110 may be shown between cards 1104 and flyers 1102.

It also may be shown that the different jobs to not align with each other. For example, cut line 1112 between cards 1104 and tickets 1106 may be offset from middle line 1114 for flyers 1102. Unlike sheet 1000 disclosed above, sheet 1100 will involve different post-processing actions to provide the documents printed using the imposition operations. Thus, the disclosed embodiments may group different books, or titles, together in the same print run according to a certain order or optimized by page count. The disclosed embodiments also may dynamically join components, such as jobs 1102, 1104, and 1106, in the same print run.

Ganging rules set forth by imposition engine 122 may keep certain contents in the same section, as shown on sheet 1100, or optimize through several sections such as using multi-lane imposition. Different components of the same job or order may be grouped automatically from a web-to-print system onto the press run. Part of an imposition layout may include automatically grouping jobs, such as jobs 1102, 1104, and 1106, thereby dynamically adjusting marks to these jobs. The disclosed embodiments also may create offset gang-runs of different size jobs and quantities to optimize the total sheets used. The disclosed embodiments also may help create digital ganging run of different size jobs and quantities on the fly efficiently.

In other embodiments, sheet 1100 may include jobs 1102, 1104, and 1106 as all business cards, but for different customers. Thus, the disclosed embodiments may include imposition of the different print jobs into one job file that is provided back to DFE 106 for printing on printing device 104.

Referring back to FIG. 1A, when client device 110 connects to web user interface 188 of DFE 106, it downloads job file 114, user interface 120 that may be used to define complex imposition, and imposition engine 122. Using imposition engine 122, the user may define imposition settings 128 to apply to job file 114, as disclosed above. Imposition settings 128 may include parameters for printing the job file and the documents therein. As they are defined, imposition setting 128 are applied to job file 114 locally within web browser 126 on client device 110. Imposition engine 122 provides the functionality to receive the desired settings from the user via user interface 120 and show how they would work for a print job.

Once the user defines imposition settings 128 for job file 114, the job file may be closed. User interface 120 captures the values or instructions for the settings. The applied imposition settings are used to generate imposition template 130 for imposed job file 132. Imposed job file 132 indicates that it is a job file that has been through imposition and is ready to print. Print driver 125 may enable further printing operations or job processing instructions to include with imposed job file 132 and imposition template 130.

System 100 uploads imposed job file 132 and imposition template 130 to DFE 106. DFE 106 may retain both job file 114 and imposed job file 132. For example, a user may wish to retrieve job file 114 to create another imposition template 130 using the disclosed processes. Imposed job file 132 may be placed in job queue 112 to be released for printing operations on printing device 104. Thus, printed document 124 is printed out with the settings defined by imposition template 130 applied to the finished document. For example, sheet 1000 may be printed with the page orientation defined by imposition template 132, and shown in FIG. 1C.

In some embodiments, another application or device may connect to DFE 106 to adjust imposition settings 128. As shown in FIG. 1A, client device 112 may include application 138. Client device 112 also may include the components shown on client device 110, including web browser 126 and print device 125. Client device 112 downloads job file 114, user interface 120, and imposition engine 122, as disclosed above, but also with imposition template 130 and, if desired, imposed job file 132. Client device 112 may connect to DFE 106 via web user interface 188 as well. In other embodiments, application 138 will access the items and retrieve them from DFE 106.

User interface 120 will be prepopulated with imposition settings 128 from imposition template 130. Using imposition engine 122 and user interface 120, the user may adjust imposition settings 128 for imposed job file 132. In other embodiments, if imposed job file 132 is not provided, the user may adjust the imposition settings and visually apply them to job file 114 as disclosed above. Once completed, a modified imposition template 140 is sent to DFE 106 to be used to print printed document 124 according to the new imposition settings. A modified imposed job file 142 also may be sent to DFE 106. Thus, the same or another user may modify the imposition settings for a print job at a client device without modifying existing imposition template 130. Further, all the processing and operations may be accomplished despite the limitations of an embedded DFE for printing device 104.

Figure 2:
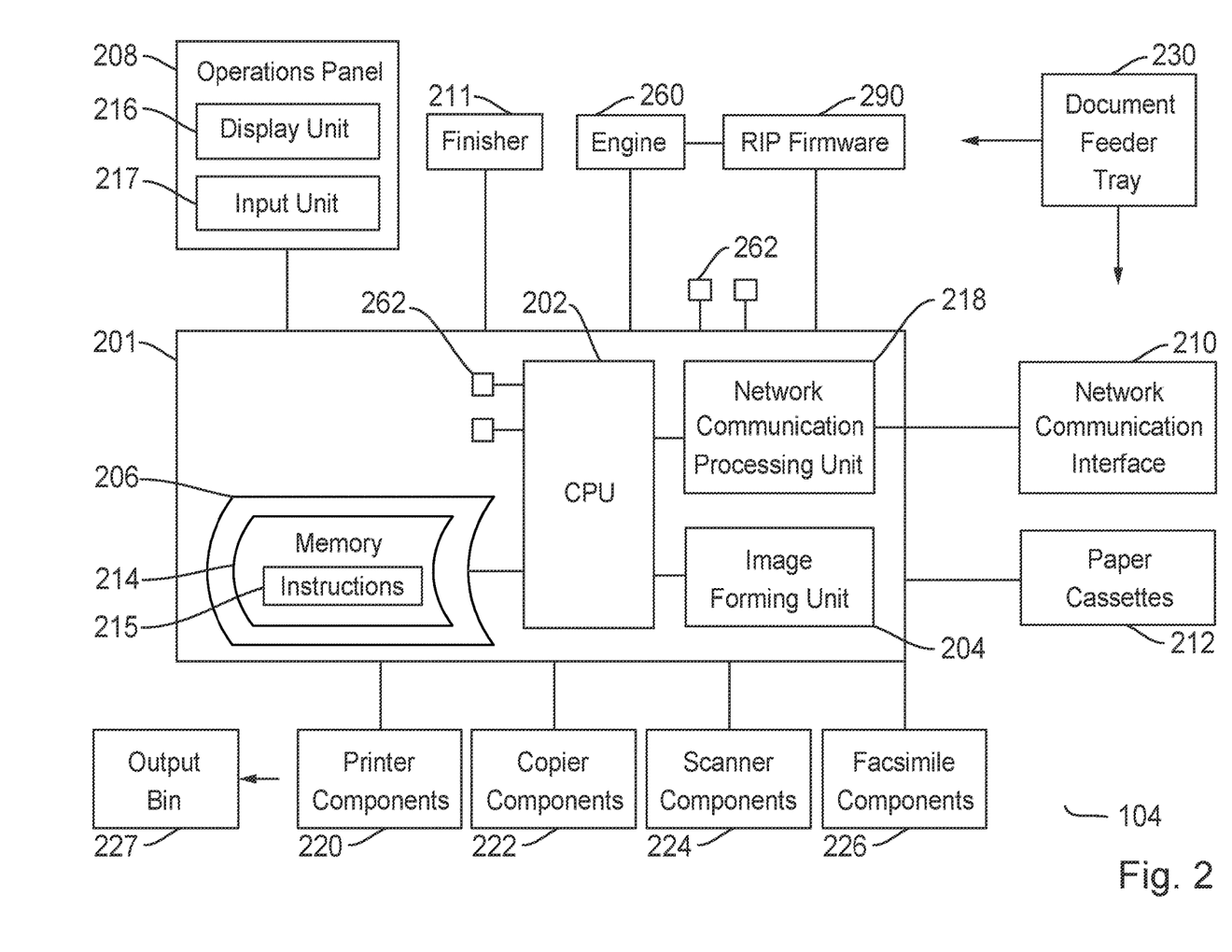
FIG. 2 illustrates a block diagram of components of the printing device for use within the printing system according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from client devices 110 and 112, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused.

Document processor input feeder tray 230 may include the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EE-PROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFE 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Memory unit 206 may include data storage 116, disclosed above. Printing device 104 communicates with client devices 110 and 112 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from client device 110.

Figure 3:
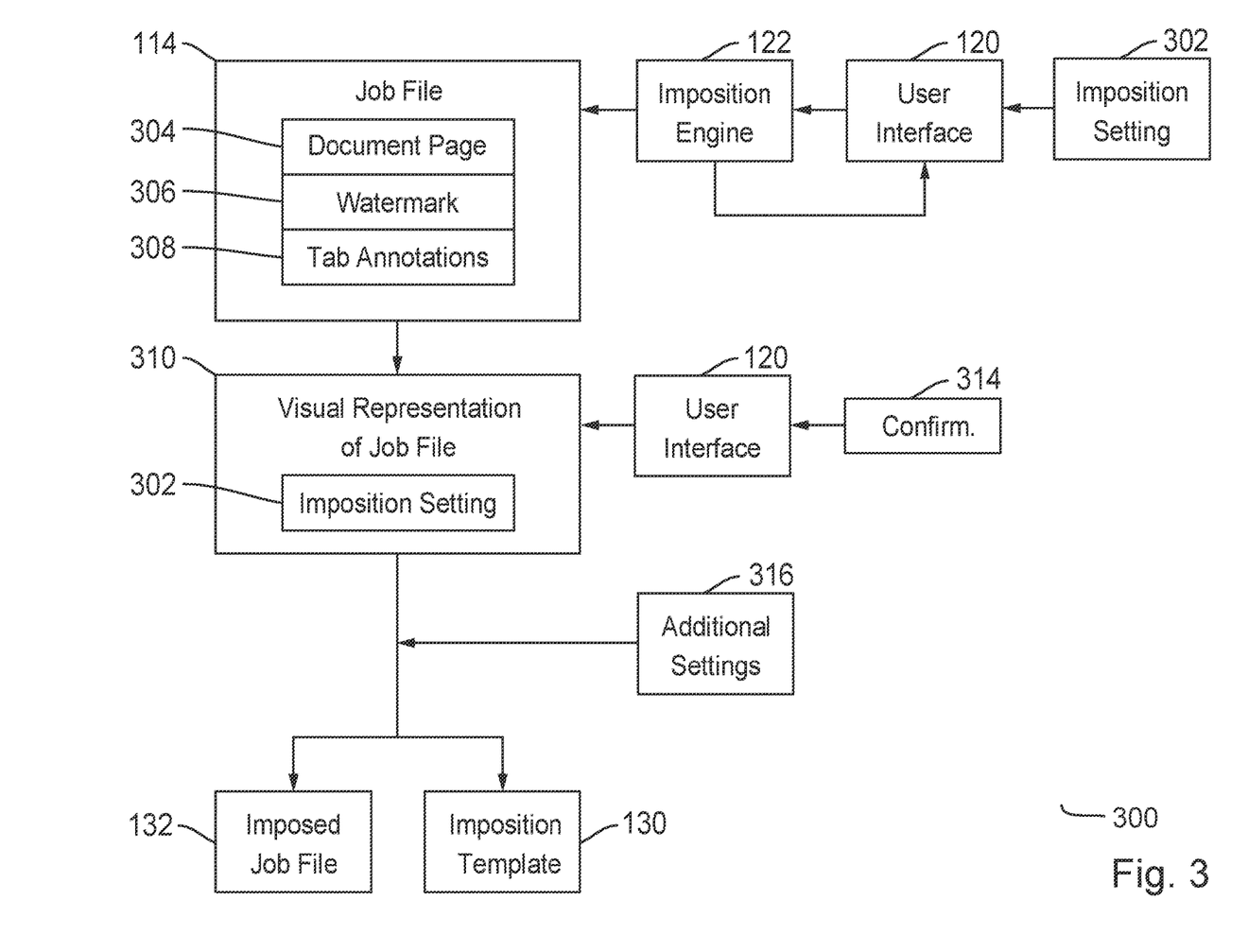
FIG. 3 illustrates a block diagram of an imposition process according to the disclosed embodiments.

FIG. 3 depicts a block diagram of an imposition process 300 according to the disclosed embodiments. Imposition process 300 is implemented using the components of system 100. As disclosed above, job file 114 is downloaded from DFE 106 to client device 110 along with user interface 120 and imposition engine 122. Job file 114 may include one or more print jobs. The user may input imposition setting 302 into user interface 120. Imposition setting 302 may include a parameter or job instruction to apply to job file 114 to print the print job according to the setting. Imposition engine 122 may define the available imposition settings using user interface 120. Once imposition setting 302 is received, imposition engine 122 may apply it to job file 114. Imposition engine 122 also takes pages from job file 114 to reorder the layout as needed. It pushes code or data for job file 114 to client device 110.

In some embodiments, application of imposition setting 302 may be one of several action directed to towards components within job file 114. For example, other actions may add, replace, or delete one or more document pages 304 from job file 114. Further, other actions may add or edit watermark 306 within job file 114. Watermark 306 may be edited to reflect a changed version of job file 114. Other actions also may add or edit tab annotations 308 within job file 114. A tab annotation may be a command that allows the user to create and modify tables and annotations within job file 114. It also may be used to insert dimensions, notes, symbols, tables, and the like to a layout of a document within job file 114. These actions also may be taken in addition to imposition operations disclosed herein. Together, these actions and the imposition operations would make ready the document for printing operations.

After receiving imposition setting 302, a visual representation 310 of one or more documents within job file 114 may be shown within user interface 120 on client device 110. User interface 120 also may allow the user to submit confirmation 314 to apply imposition setting 302 and show it on visual representation 310. Confirmation 314 also may accept imposition setting 302 as one of imposition settings 128 for job file 114. Thus, job file 114 may be updated with this information according and imposition setting 302 added to imposition template 130.

Additional settings 316 may be defined for job file 114, as disclosed above. Imposition engine 122 may apply additional settings 316 to be confirmed or changed as instructed. When imposition operations are complete, user interface 120 may be closed. Imposition engine 122 then may generate imposed job file 132 and imposition template 130 made up of imposition settings 128, or imposition setting 302 and additional settings 316. Imposed job file 132 and imposition template 130 are forwarded to DFE 106. Client device 110 may keep the other components until another job file is downloaded with its own user interface and imposition engine, possibly from another printing device within system 100.

Figure 4:
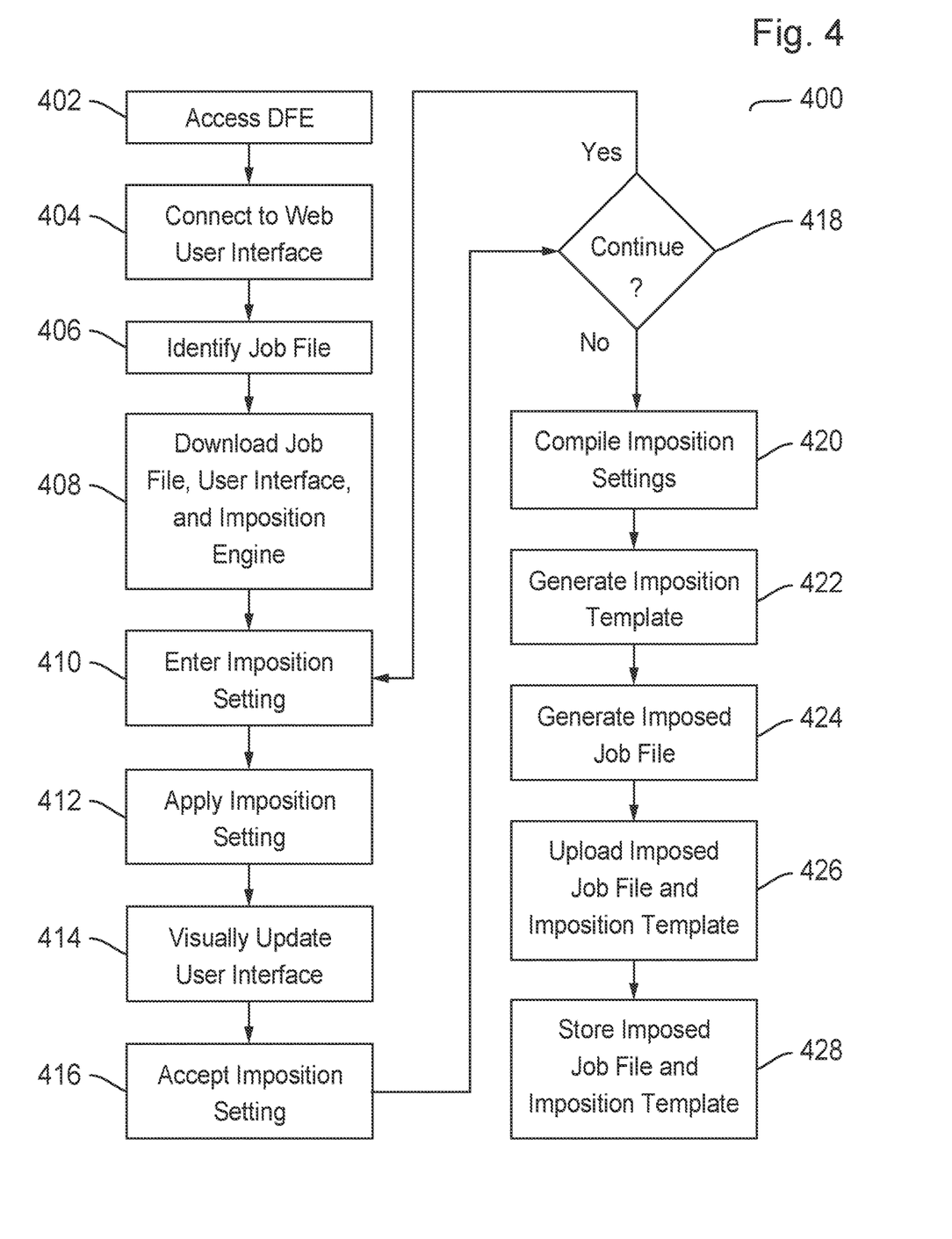
FIG. 4 illustrates a flowchart for defining a print job within the printing system using imposition according to the disclosed embodiments.

FIG. 4 depicts a flowchart 400 for defining a print job within printing system 100 using imposition according to the disclosed embodiments. Flowchart 400 may refer to the features of FIGS. 1A-3 for illustrative purposes. Flowchart 400, however, is not limited to the features disclosed by FIGS. 1A-3.

Step 402 executes by accessing DFE 106 by client device 110 for printing operations. The user at client device 110 would like to prepare a print job at DFE 106 for printing. In some embodiments, client device 110 plans to send a print job to printing device 104 but would like to perform imposition operations before hand. Step 404 executes by connecting client device 110 to web user interface 188 of DFE 106. Step 406 executes by identifying job file 114 at DFE 106 for imposition operations. Identification may come from client device 110. Job file 114 may be a print job within job queue 112. Alternatively, job file 114 may be a file stored at DFE 106, awaiting instructions to place it within job queue 112.

Step 408 executes by downloading job file 114, user interface 120, and imposition engine 122 from DFE 106 to client device 110. For example, user interface 120 and imposition engine 122 may be stored in data storage 116 of DFE. Once job file 114 is identified to be sent to client device 110, DFE 106 attaches user interface 120 and imposition engine 122 to the data sent to the client device. Client device 110 then uses user interface 120 within web browser 126, or other application, to disclose options, settings, and parameters related to job file 114. Imposition engine 122 may provide the available options, settings, and parameters to user interface 120 to display.

Step 410 executes by entering imposition setting 302 using user interface 120 at client device 110. Alternatively, the user may select imposition setting 302 from a group of settings available through user interface 120. Imposition setting 302 may include an instruction or parameter to impose on the print job for job file 114. It also may include job instructions for processing the print job for job file 114. Step 412 executes by applying imposition setting 302 onto job file 114. Imposition engine 122 may reorder the layout of the print job using the source data from job file 114 according to imposition setting 302. Step 414 executes by visually updating user interface 120 with imposition setting 302 shown on a visual representation of the print job for job file. For example, user interface 120 may show sheet 1000 with imposition setting 302 for page orientation.

Step 416 executes by accepting imposition setting 302 using user interface 120. The user may accept imposition setting 302 by clicking on a button or the visual representation of the imposition setting. Step 418 executes by determining whether the user would like to continue selecting imposition settings to apply to job file 114 as disclosed above. If step 418 is yes, then flowchart 400 returns to step 410 to enter another imposition setting 302.

If step 418 is no, then step 420 executes by compiling the applied imposition settings, or imposition settings 128, selected by the user during the imposition operations. Not every setting may be applied that is available. Step 422 executes by generating imposition template 130 from imposition settings 128. Imposition template 130 may be the pre-defined set of imposition settings to be applied when printing the print job to enforce the layout and other print job instructions to accompany the print job. Step 424 executes by generating imposed job file 132. Imposed job file 132 may include the modified data from job file 114, as defined by imposition engine 122.

Step 426 executes by uploading imposed job file 132 and imposition template 130 from client device 110 to DFE 106. Client device 110 may keep imposition engine 122 and user interface 120 in the event the user wants to perform imposition operations on job file 114 for a second print job. For example, a book may be printed out with a different orientation of pages than the existing imposed job file. DFE 106 also has the information needed to enact complex imposition without having to do the processing itself. Step 428 executes by storing imposed job file 132 and imposition template 130 at DFE 106, for example, in data storage 116. Imposition template 130 may be saved under a filename to identify the imposition settings therein and distinguish it from other imposition templates corresponding to job file 114. DFE 106 also may retain job file 114 for other imposition operations, as disclosed below.

Figure 5A:
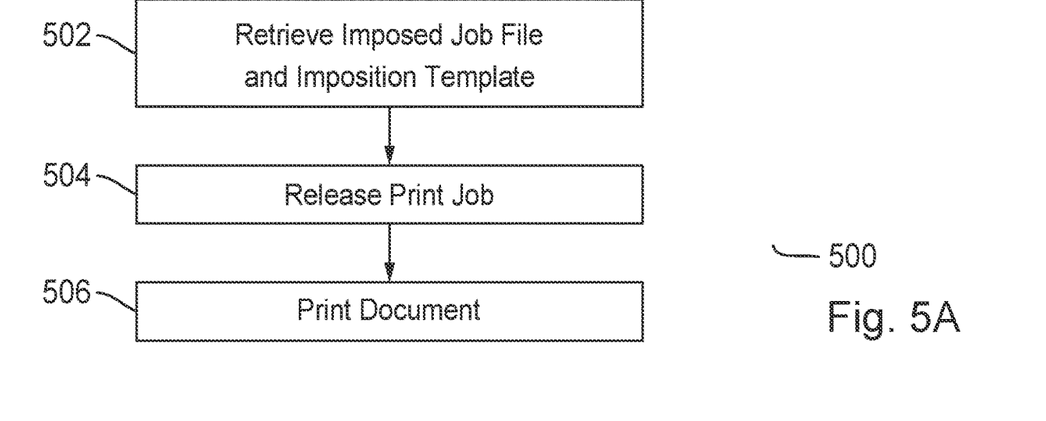
FIG. 5A illustrates a flowchart for using an imposed job file and an imposition template in printing operations according to the disclosed embodiments.

FIG. 5A depicts a flowchart 500 for using imposed job file 132 and imposition template 130 in printing operations according to the disclosed embodiments. Flowchart 500 may refer to the features of FIGS. 1A-4 for illustrative purposes. Flowchart 500, however, is not limited to the features disclosed by FIGS. 1A-4.

Step 502 executes by retrieving imposed job file 132 and imposition template 130 from data storage 116. A print job may be submitted to print the document associated with imposed job file 132. The print job may be placed in job queue 112 of DFE 106. Step 504 executes by releasing the print job for imposed job file 132 from job queue 112. Step 506 executes by printing document 124 with imposition settings 128 as defined by imposition template 130. Printing device 104 applies the settings and apply any job instructions specified for imposed job file 132 used to generate the data to print document 124.

Figure 5B:
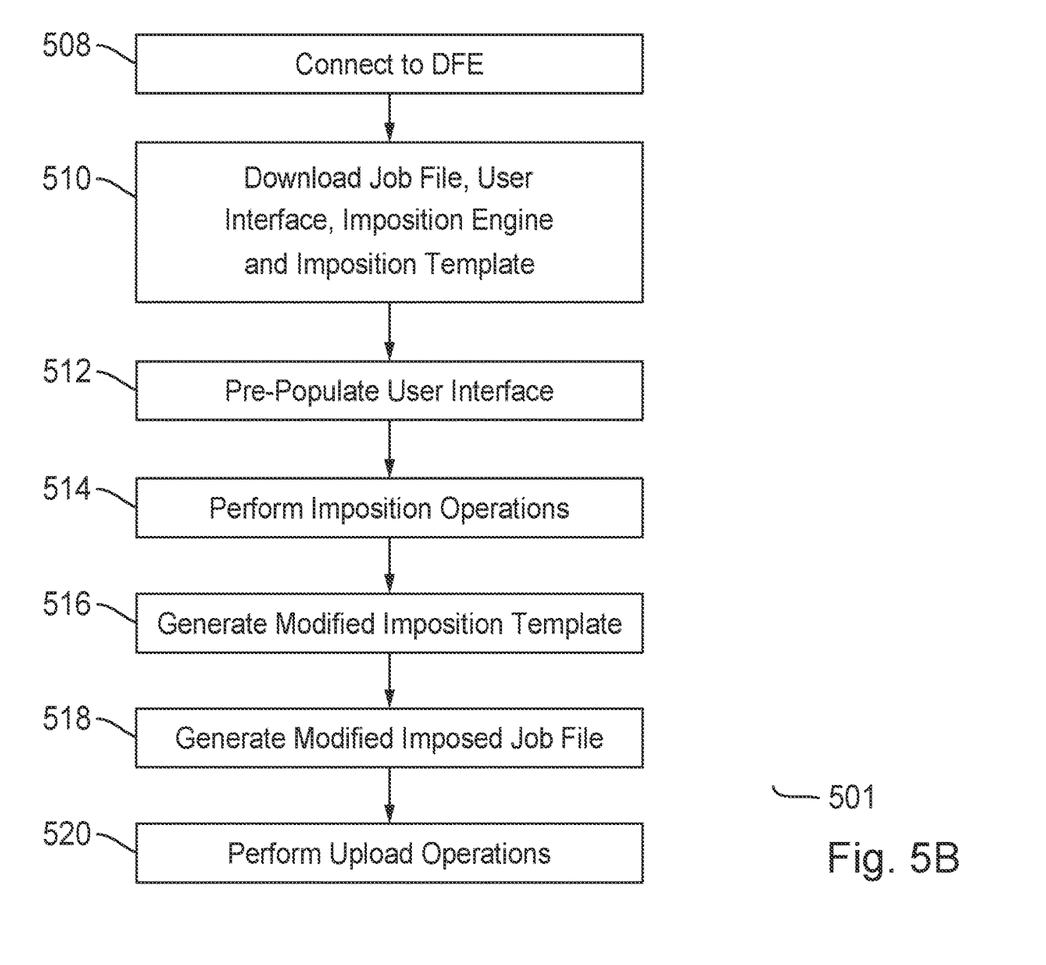
FIG. 5B illustrates a flowchart for generating a modified imposed job file and a modified imposition template according to the disclosed embodiments.

FIG. 5B depicts a flowchart 501 for generating a modified imposed job file and a modified imposition template according to the disclosed embodiments. Flowchart 501 may refer to the features of FIGS. 1A-5A for illustrative purposes. Flowchart 501, however, is not limited to the features disclosed by FIGS. 1A-5A.

In some instances, the user, or another user, may wish to modify imposition template 130 to adjust imposition settings 128. Thus, flowchart 501 discloses processes to accomplish these actions at another client device, such as client device 112. Step 508 executes by connecting to DFE 106 at printing device 104, as disclosed above. Client device 112 or application 138 thereon may connect to web user interface 188, as disclosed above in step 406 in flowchart 400.

Step 510 executes by downloading job file 114, user interface 120, imposition engine 122, and imposition template 130. This step also may download imposed job file 132 associated with imposition template 130. These items are downloaded to client device 112 from DFE 106. Step 512 executes by pre-populating user interface 120 with imposition settings 128 of imposition template 130. Thus, the user does not need to redefine the imposition settings for the previous imposition operations.

Step 514 executes by performing imposition operations, as disclosed by steps 410-410 of flowchart 400 above. These steps are executed at client device 112 using user interface 120 and imposition engine 122. Step 516 executes by generating a modified imposition template based on the adjustments made to imposition template 130 or to imposition settings 128. Step 518 executes by generating a modified imposed job file as well. Modified imposed job file and modified imposition template should differ from imposed job file 132 and imposition template 130 already stored at DFE 106. Step 520 executes by performing the upload operations disclosed in steps 426 and 428 of flowchart 400 above for the modified imposed job file and the modified imposition template. Thus, more than one imposition may be associated with job file 114.

In this manner, imposition operations and processing may be pushed to the client devices within a printing system. An embedded DFE can enable the imposition processing available to server DFEs without upgrades or additional software at the client devices. Further, embedded DFEs may provide additional flexibility in printing operations to allow multiple impositions to occur for one job file. Multiple documents with different layouts and other features may be printed from a single job file.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A printing system comprising:
an embedded digital front end (DFE) to control printing operations within a printing device, wherein the embedded DFE receives imposition settings defined for a print job;
a first client configured to submit the print job to the embedded DFE with an imposition template that defines the imposition settings,
wherein the first client downloads an imposition engine to define the imposition template, a user interface to interact with the imposition engine, and a job file for the print job from the embedded DFE,
the imposition engine, at the first client, is configured to reorder the job file to generate an imposed job file using the user interface at the first client to define the imposition settings, and
wherein the first client uploads the imposed job file and the imposition template with the imposition settings to the embedded DFE.

2. The printing system of claim 1, wherein the embedded DFE stores the job file and the imposed job file.

3. The printing system of claim 1, wherein the first client is an application executing on a device connected to the printing device.

4. The printing system of claim 1, further comprising a second client connected to the printing device to access the embedded DFE to download the imposition template, the imposition engine, the user interface to interact with the imposition engine, the job file for the print job, and the imposition template.

5. The printing system of claim 4, wherein the second client downloads the imposed job file.

6. The printing system of claim 4, wherein the user interface is populated with the imposition settings from the imposition template at the second client.

7. The printing system of claim 6, wherein the user interface, at the second client, adjusts the imposition settings.

8. A method for defining a print job within a printing system, the method comprising:
- downloading, at a client, an imposition engine, a user interface to interact with the imposition engine, and a job file for the print job from an embedded digital front end (DFE) of a printing device connected to the client;
- entering, via the user interface at the client, imposition settings for the job file;
- applying the imposition settings to the job file using the imposition engine at the client to create an imposed job file;
- generating an imposition template for the job file based on the applied imposition settings at the client; and
- uploading the imposed job file and the imposition template from the client to the embedded DFE.

9. The method of claim 8, further comprising storing the job file and the imposed job file at the embedded DFE.

10. The method of claim 8, wherein the entering step includes adding, deleting, or replacing at least one document page from the job file.

11. The method of claim 8, wherein the entering step includes adding or editing a watermark within the job file.

12. The method of claim 8, wherein the entering step includes adding or editing a tab annotation within the job file.

13. The method of claim 8, further comprising connecting the client to a web user interface of the embedded DFE.

14. The method of claim 8, further comprising visually updating the user interface to display the imposition settings.

15. A method for printing a document, the method comprising:
- creating a print job for the document at a first client connected to a printing device;
- downloading, at the first client, an imposition engine, a user interface to interact with the imposition engine, and a job file for the print job from an embedded digital front end (DFE) of the printing device;
- using the imposition engine to define imposition settings for the job file using the user interface at the first client;
- applying the imposition settings to a visual representation of the job file within the user interface;
- confirming the imposition settings for the job file to create an imposed job file;
- generating an imposition template based on the imposition settings at the first client;
- receiving the imposed job file and the imposition template at the embedded DFE of the printing device; and
- printing the imposed job file for the document with the imposition template at the printing device.

16. The method of claim 15, further comprising connecting a second client to the embedded DFE of the printing device to access the job file.

17. The method of claim 15, further comprising connecting a second client to the embedded DFE of the printing device to access the imposed job file.

18. The method of claim 17, further comprising downloading the imposition engine, the user interface, the imposed job file, and the imposition template.

19. The method of claim 18, further comprising populating the user interface with the imposition settings from the imposition template.

20. The method of claim 19, further comprising adjusting the imposition settings.

* * * * *